(No Model.)  4 Sheets—Sheet 2.
R. STANLEY.
MINING MACHINE.

No. 577,331. Patented Feb. 16, 1897.

Witnesses:  Inventor.

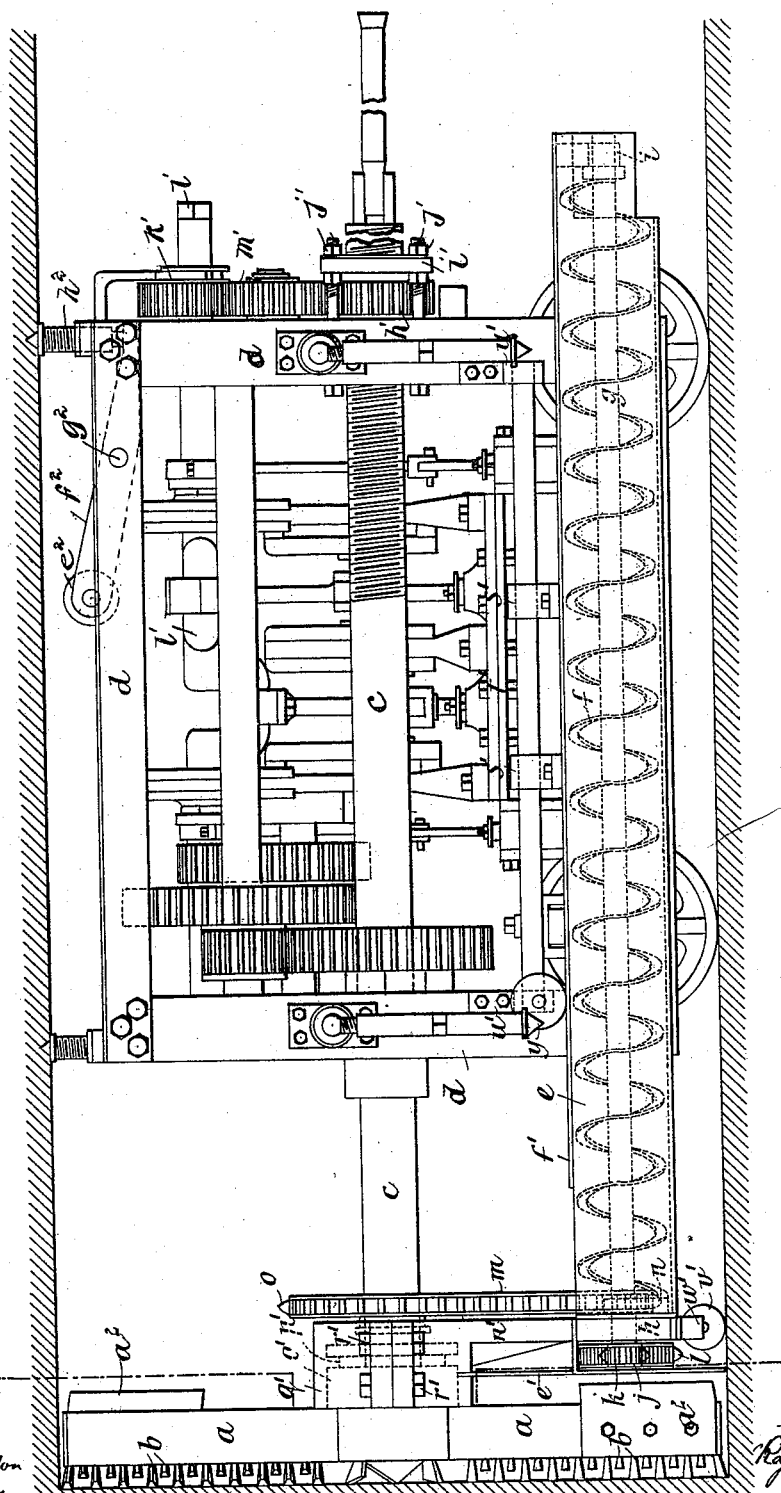

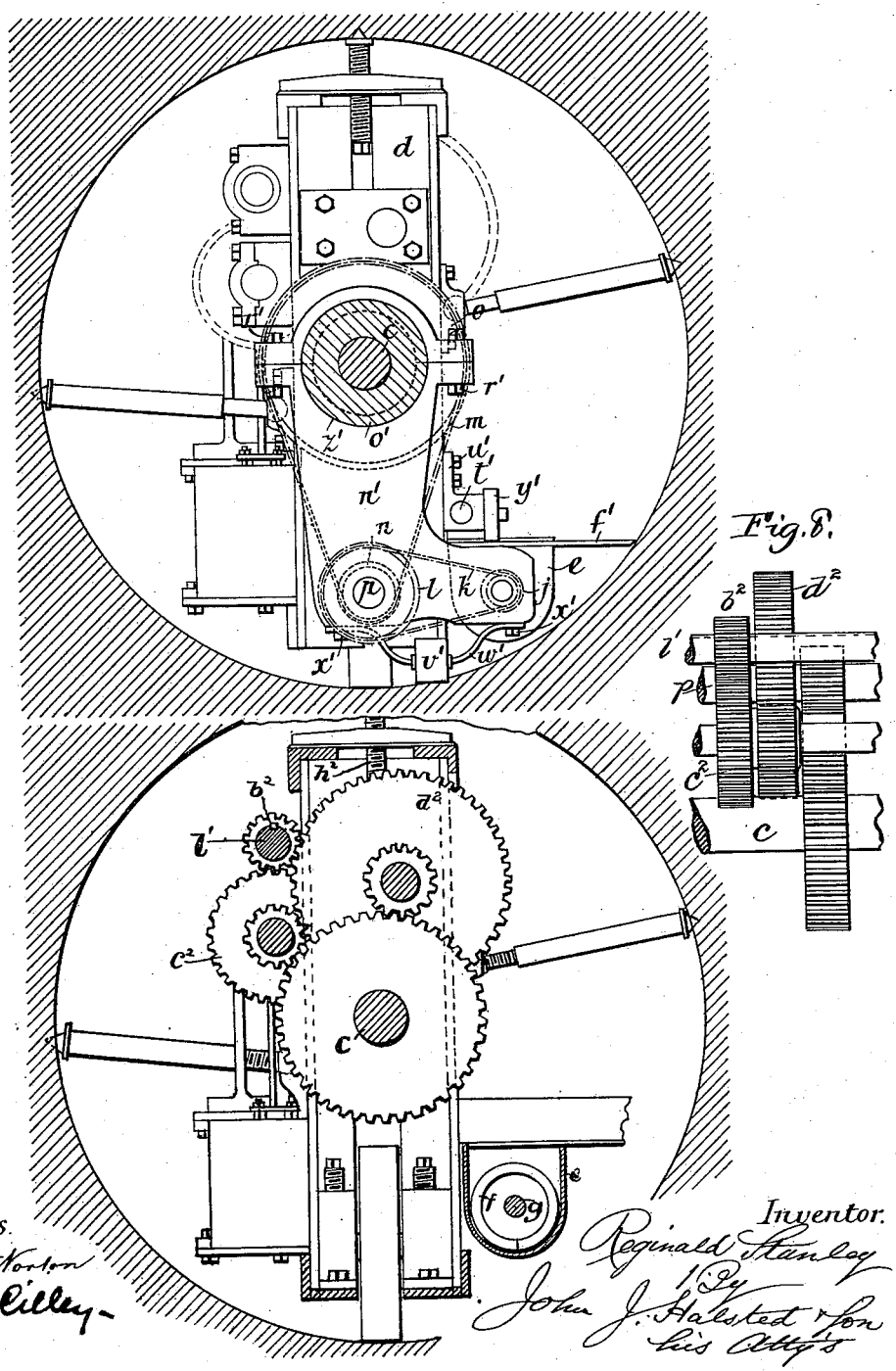

United States Patent Office.

REGINALD STANLEY, OF NUNEATON, ENGLAND.

MINING-MACHINE.

SPECIFICATION forming part of Letters Patent No. 577,331, dated February 16, 1897.

Application filed April 9, 1890. Renewed September 12, 1896. Serial No. 605,643. (No model.) Patented in England September 13, 1889, No. 14,348; in New South Wales June 27, 1891, No. 3,082; in Queensland June 29, 1891, No. 1,363; in New Zealand July 6, 1891, No. 5,078; in Canada December 16, 1891, No. 37,971, and in Germany February 5, 1892, No. 60,237.

*To all whom it may concern:*

Be it known that I, REGINALD STANLEY, a subject of the Queen of Great Britain, residing at Nuneaton, England, have invented new and useful Improvements in Boring or Tunneling Machines, (for which I have heretofore received English Letters Patent No. 14,348, dated September 13, 1889, and Letters Patent in the following countries: Germany, No. 60,237, dated February 5, 1892; Canada, No. 37,971, dated December 16, 1891; New Zealand, No. 5,078, dated July 6, 1891; Queensland, No. 1,363, dated June 29, 1891, and New South Wales, No. 3,082, dated June 27, 1891,) of which the following is a specification.

Figure 1:
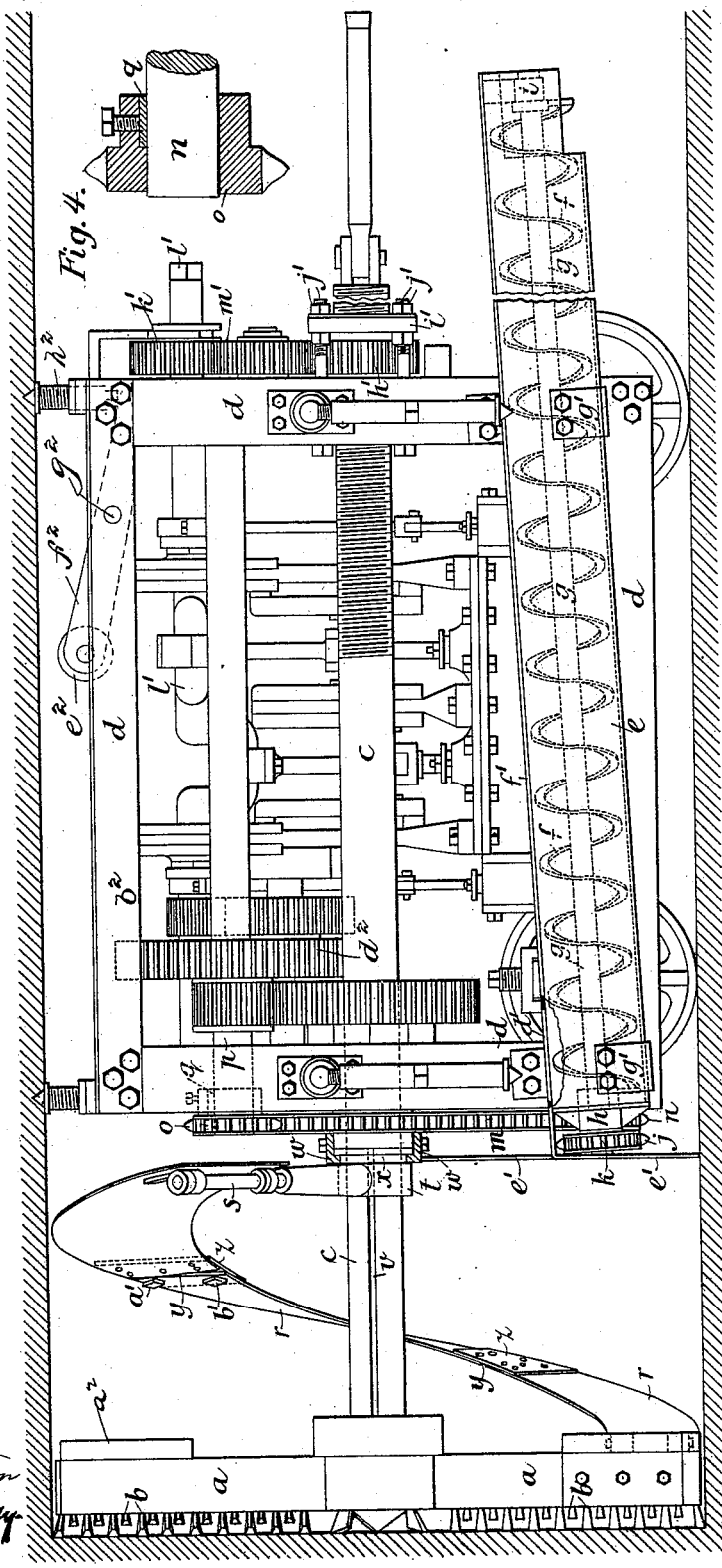
Figure 2:
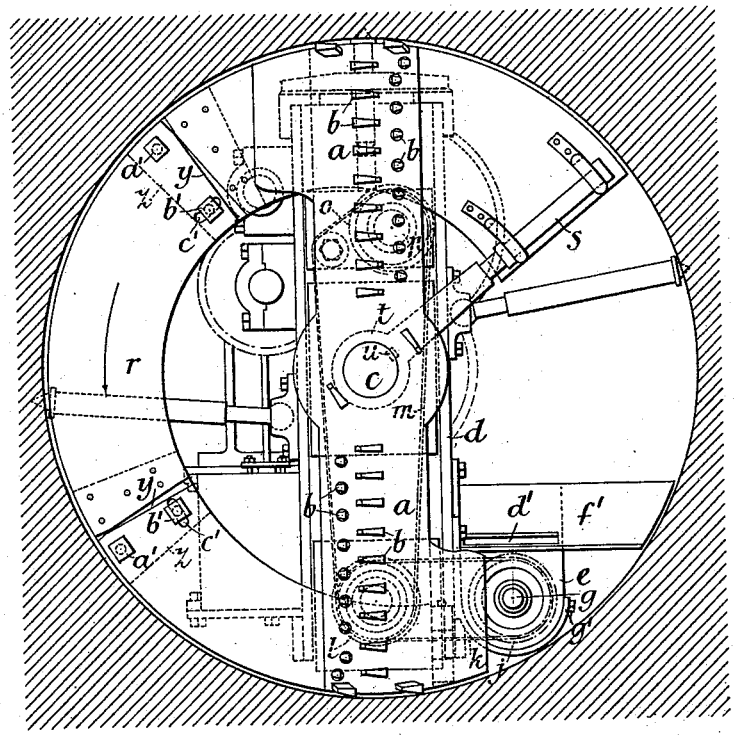
Figure 3:
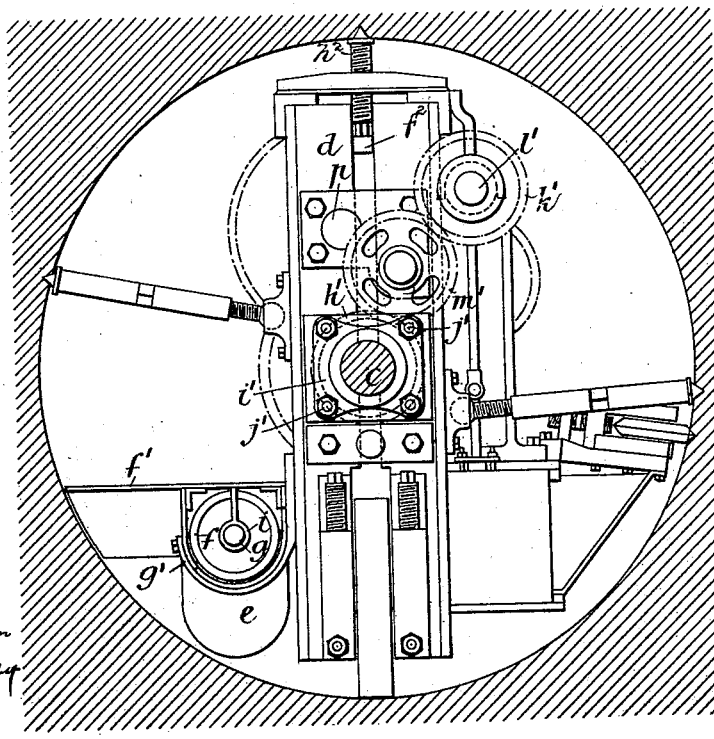

Figure 1 is a side elevation of a boring or tunneling machine having arms and cutters adapted to cut away the entire face of the tunnel and provided with a trough and worm conveyer, a flexible helical scraper, and a spur-wheel with threaded boss or bush arranged and working on the threaded portion of the central shaft according to my present improvements, the machine being shown at work in a tunnel or heading. Fig. 2 is a front elevation, and Fig. 3 is a rear elevation, of the same. Fig. 4 is a section of a detail. Fig. 5 is a side elevation of a tunneling-machine, illustrating a modified arrangement of the trough and worm conveyer where the use of the flexible helical scraper is dispensed with. Fig. 6 is a transverse vertical section on the line A B of Fig. 5. Fig. 7 is a section on the line $x\,x$, Fig. 1. Fig. 8 is a detail view showing the shafting and the sliding pinion.

Similar letters in all the figures indicate similar or corresponding parts.

Referring to Figs. 1, 2, and 3, $a\,a$ are the radial arms of the machine, adapted to cut away the whole face of the tunnel by means of a series of cutters $b$, arranged along the arms $a$, which extend across the diameter of the tunnel and are carried on the central shaft $c$, working in the frame $d$, which latter is fixed in the tunnel during the cutting operation, as described in my former patents, No. 345,551, dated July 13, 1886, and No. 414,893, dated November 12, 1889.

Upon the frame $d$ is mounted an engine which drives a crank-shaft $l'$. Two sets of speed-reducing gear connect the crank-shaft with the cutter-carrier $c$, there being a sliding pinion $b^2$ on the crank-shaft, which can engage either with a wheel $c^2$ of one set or wheel $d^2$ of the other set. When pinion $b^2$ is engaged with wheel $c^2$, the power is transmitted through three pairs of wheels, imparting a slow motion to the central shaft; but when the pinion $b^2$ is engaged with wheel $d^2$ a faster motion is imparted to the said shaft $c$. Thus it will be seen that I have provided for a slow rotation with increased cutting-power of the cutter for working in very dense material and a faster rotation with less cutting-power for working in soft material.

$e$ is the trough extending alongside the machine and in which a worm-conveyer $f$ revolves, the top front end of the trough being open to admit the cuttings and fine debris produced by the action of the cutters upon the face of the tunnel. The worm $f$ is arranged upon a worm-shaft $g$, which is carried in bearings $h$ and $i$ and has a chain-wheel $j$, keyed on its front end and driven by a chain $k$, passing over an intermediate chain-wheel $l$, and by a chain $m$, passing over another intermediate wheel $n$, fixed to the wheel $l$, from a chain-wheel $o$, secured on an intermediate shaft $p$ of the machine, by the action of a friction-pin or screw-brake $q$, (illustrated more clearly in Fig. 4,) which prevents breakage of the gearing if a sudden strain arises from any cause, as the shaft $p$ would then rotate without operating the gearing.

Attached to the back of one of the radial arms $a$ and working on a hinge thereon is the flexible helical scraper $r$ for scraping back and into the front end of the conveyer-trough $e$ the cuttings and fine debris resulting from the process of cutting. The rear end of the scraper $r$ is held by an arm $s$, to which it is attached in the manner shown, thereby allowing the scraper $r$ to change its position on the arm $s$ as it becomes elongated or contracted. The boss $t$ of the arm $s$ is fitted on the shaft $c$ and caused to revolve with it by means of a feather or key $u$, which works in the groove or key-bed $v$, the arm being prevented from moving forward when the shaft $c$ advances out of the frame $d$ by means of a flanged collar $w$, which is attached to the frame $d$, the flange of which collar works in a groove $x$ in the boss $t$ of the arm $s$. The scraper $r$ is advantageously made with one or more joints $y$, which tend to lessen the reduction of its diameter as it becomes elongated. These joints can, however, be dispensed with where the material of which the scraper is composed is sufficiently flexible. The said joints, as most clearly shown in Fig. 2, consist of plates $z$ and screw-pins $a'$ and $b'$, the pins $a'$ forming hinges and the pins $b'$ nearest the center of the tunnel working in slots $c'$ to allow of the edge of the scraper nearest the center expanding and contracting as the scraper is extended. As the cutting proceeds the scraper $r$ sweeps the cuttings back toward the worm-trough $e$, which cuttings are, by means of the arm $s$ and scraper $r$, lifted and forced back into the trough $e$ through an opening $d'$ (shown in Fig. 2) and are carried along the trough by the worm $f$ and expelled at the back end, whence they are removed in tubs or in any other suitable manner.

The cuttings are prevented from getting into the chain and wheel gearing and under the machine by a plate $e'$, Fig. 1, attached to the frame and turned over the front edge of the trough $e$. This plate is not shown in Fig. 2, it being removed for the purpose of clearly illustrating the gearing situated behind it. With the exception of the opening $d'$ for the admittance of the cuttings the trough $e$ is covered over with a plate $f'$, which extends horizontally to the circumference of the tunnel and allows of men traveling upon it or of material being passed backward and forward. The worm-trough $e$ is attached to the side of the frame $d$ by means of brackets $g'$ $g'$, which allow of the trough being raised or lowered, as required.

Figs. 1 and 3 also show the propelling-gearing for advancing the frame with the engine and gearing in the tunnel between the periods occupied in cutting, the arrangement being the same as described in my former patent, No. 414,893, in combination with a boring or tunneling machine adapted to cut an annular groove in the face of the tunnel, the said propelling-gear being here shown in combination with a tunneling-machine adapted to cut away the whole of the face of the tunnel. This arrangement consists of a spur-wheel $h'$, fitted with a screw-threaded boss or bush working upon or over the thread of the central or screw-threaded shaft $c$. This wheel is held in position on the frame $d$ of the machine by means of a plate $i'$ and bolts and nuts $j'$ $j'$.

$k'$ is the cog-wheel on the crank-shaft $l'$ of the machine, to which wheel, through the intermediate wheel $m'$, the spur-wheel $h'$ is geared.

A shifting-fork is employed, operated by a handle, for throwing the cog-wheel $k'$ in and out of gear.

A pin is inserted through one of the holes in the wheel $m'$ and in the frame $d$ of the machine, when required, to prevent the spur-wheel $h'$ from revolving while the cutting-gear and the screw-threaded shaft $c$, with the arms $a$ and cutters $b$ attached thereto, are in motion; or any other suitable means can be employed for this purpose.

In order to steady and keep the frame upright while it is being advanced in the tunnel between the periods of cutting, I sometimes use (especially when the side of the tunnel is soft or broken and irregular) a top wheel or roller $e^2$, fitted into a slot in the end of a lever $f^2$, which works in the top of the frame on a hinge-pin $g^2$. The screw-pin $h^2$, when unscrewed from the roof of the tunnel, presses down on the back end of the lever $f^2$ and raises the wheel or roller $e^2$ against or into the roof sufficiently tight to hold the frame upright. Thus it will be seen that I have provided an alternately-acting lock and guide-wheel, the one to fasten the frame rigidly to the tunnel-wall and the other to press against the wall while the frame is being moved.

I am aware that it has been proposed in an earlier machine to use a guide-roller, always kept in engagement with the roof by means of a weighted lever, the roller being alone depended upon to hold the frame against any reactionary thrust; but both the machine and the steadying device were different from mine. The machine was of the class in which the frame advanced with the cutters, there being no use for a positive lock to secure the frame stationarily to the walls. Then, too, whereas my roller is positively pressed into engagement with the walls that in the earlier machine was merely held in engagement by a weight, such machine being moved forward by four wheels or tracks placed for the purpose and not requiring such steadying as is requisite in advancing my machine, which is mounted upon centrally-placed wheels. I provide side-stay telescopic screw-pins to hold the frame steady while the cutting is in progress with ball-and-socket hinges, it being found in practice that other hinges are often broken in consequence of the frame pushing back while the machine is cutting. The ball-and-socket hinges prevent this occurring.

In the modified arrangement of the trough and worm conveyer illustrated in Figs. 5 and 6, in which the scraper and the auxiliary arm to which it is attached are dispensed with, the trough and worm conveyer and gearing, instead of being fixed to the frame $d$ and remaining stationary while the cutter-arms are advancing are advanced in the tunnel as the cutting proceeds, the cuttings being lifted into the trough by the action of the cutter-arms $a$. In this arrangement I employ a steel bracket $n'$, held upon the central shaft c and upon the boss o' of the arms a by means of a groove p' in the said boss, into which the two halves of the boss q' of the bracket fit, and are secured by screw-bolts and nuts r, whereby the bracket is not only held steady, but is caused to advance with the arms and cutters without rotating therewith. This bracket carries below the shaft c the gearing for operating the worm f, which conveys the cuttings to the rear of the machine. The worm-conveyer is driven from the central shaft c by the chain-wheel o, which in this arrangement is keyed thereon, and by the chain m connects it with the smaller or intermediate chain-wheel n, working on the small shaft p, on which it is held by a friction-pin q, similar to that described when referring to Figs. 1 to 4, and which is tightened just enough to drive the small shaft p and the chain-wheel n and chain-wheel l on the other or front side of the bracket n', but allows the brake to slip if any unusual strain comes upon the worm-conveyer or any of the parts connected therewith, and thus prevents breakage. The wheel l is connected by the chain k with and drives the small wheel j, which, being keyed on the worm-shaft g, causes the worm f to revolve at the same time the shaft and cutters advance in the heading. The steel bracket n' being attached to the front of the conveyer and the conveyer-shaft draws the trough e and worm-conveyer f along with it as the arms and cutters advance in the tunnel. The trough e is carried by two hanging brackets s' s', attached thereto at about the middle of its length, which brackets are adapted to slide along a bar t', carried by brackets u' u' on the front and back uprights of the machine. The weight of the trough e, bracket n', radial arms a, &c., is partly borne by a wheel or roller v', which is attached to the bottom of the steel bracket n' by a spring-bar w', secured by pins x' x' to the bracket. The said pins work in slots in the spring-bar, and thereby allow it to yield slightly when extra strain comes upon it.

A wheel y', attached to the front bracket u' and working over the cover f' of the worm-trough e, prevents the cover from rising through any extra strain or the bearing z' from becoming heated. I sometimes dispense with the wheel v'. The plate e' is carried forward in the tunnel as the cutting proceeds and a portion of it laps over the front of the worm-trough e and chain-wheel j with chain k, and thereby keeps the cuttings from getting into the gearing. The construction otherwise is the same as that hereinbefore described with reference to Figs. 1, 2, and 3.

The front sides of the radial arms a are splayed and advantageously provided with scrapers $a^2$, attached as shown, so that the cuttings are carried back to the sides of the tunnel by the arms, whence they are drawn by an attendant by means of a rake into the open end of the worm-trough e, the attendant being on the cover of the trough e when the arms are working near the frame d, and by a shovel when he takes his place between the frame d and arms a, the latter having advanced sufficiently far in the tunnel to allow him sufficient room to do so.

It will be seen that in both constructions the engine is mounted eccentrically of the tunnel upon one side of the main frame and that the conveyer is mounted eccentrically upon the other side of the said frame. The trough is placed as distant as possible from the central horizontal plane of the tunnel in order to provide a passage for the attendant and to give him sufficient room to rake the cuttings into the conveyer, as just described.

Power is applied to the conveyer in each construction by means of two chains, one arranged vertically and the other horizontally. The reason for this will be clearly understood, for if the conveyer-shaft were driven by a chain direct from the central shaft or from the power-shaft it would so close the open space at the side that it would be impossible for the attendant to have access readily to the front part of the machine without danger of injury to himself.

I am aware of the fact that machines have been heretofore proposed or constructed in which a conveyer was mounted to advance with the cutter-head, and I do not broadly claim such a construction. I use a device which is peculiar to my own machine, which has an alternate advance of the main frame and the cutter-carriage. By mounting one conveyer stationarily upon the stationary bed and by mounting upon the relatively advancing cutter-head another conveyer which will sweep the cuttings into the first said conveyer I am not only enabled to remove the cuttings from the fore part of the machine, but also am enabled to withdraw them to the rear of the machine and deposit them in one spot. Although in the earlier machines the cuttings may have been withdrawn, yet the conveyer moving with the cutter-head deposited the cuttings in a stream along the floor of the tunnel in the rear of the machine; and I am not aware that it has ever been proposed to mount upon a stationary bed a stationary conveyer to operate in conjunction with an advancing cutter-head and an advancing conveyer, which last said conveyer picks up the cuttings and delivers them to the stationary conveyer. By use of my relatively small conveyer, which is mounted upon the side of the bed-frame, the cuttings are withdrawn and may be delivered to a cart or left in a series of piles, where they may be easily picked up or carted away.

Having now particularly described and ascertained the nature of my said invention and in what manner the same is to be performed, I declare that what I claim is—

1. In a tunneling-machine of the class described, the combination of the rotary cutter-head, the central longitudinally-arranged driving-shaft secured to the cutters, the rectangular bed-frame having the front and rear uprights and the top and bottom longitudinally-arranged connecting-bars, all lying in substantially the central vertical planes of the tunnel, the power-shafting on said bed, means for positively fastening the bed to the tunnel-wall to hold it stationary while the cutters advance relatively forward, a conveyer arranged eccentrically to the tunnel and supported upon one side of said bed and extending toward the rear thereof, a vertical drive-chain driven by the aforesaid shafting, a horizontal driving-chain actuated by the vertical chain and connected to the conveyer, and means carried by the cutter-head for picking up the cuttings and delivering them to said conveyer, substantially as set forth.

2. In a tunneling-machine of the class described, the combination of a rotary cutter-head, the central longitudinally-arranged driving-shaft secured to the cutter-head, the rectangular bed arranged in the central longitudinal vertical planes of the tunnel, means for locking said frame stationary to the walls of the tunnel while the cutters advance, the gearing on the bed-frame, the engine supported eccentrically on one side of the bed and situated in the open space between said bed and the side wall of the tunnel, a conveyer supported eccentrically of the tunnel upon the frame on the opposite side and below the central horizontal plane thereof and extending toward the rear thereof, power-transmitting devices connecting the engine with the conveyer for driving the latter, and a platform supported upon the side of the frame above the conveyer, said conveyer, power-transmitting devices, and platform being all arranged as aforesaid whereby a free space is provided for the movements of the operative on the side of the bed-frame opposite the engines, substantially as set forth.

3. In a tunneling-machine, the combination with the stationary main frame, the engine, the gearing, the longitudinally-advancing cutter-carrying shaft, and the cutter-arms, of a flexible extensible conveyer mounted on said shaft and working around the circumference of the tunnel, one end being attached to the frame and the other secured to the cutter-arms, said conveyer being composed of two or more parts movable relatively to each other, substantially as set forth.

4. The combination, in a tunneling-machine, with the frame, the gearing, the longitudinally-advancing cutter-driving shaft, and the cutter-arms secured thereon, of the arm $s$ secured to the frame and revolving with the cutter-shaft, and the extensible conveyer having one end secured to the arm $s$, and the other end to the cutter-arms, substantially as set forth.

5. In a tunneling-machine, the combination with the frame, the gearing, the longitudinally-advancing cutter-driving shaft, and the cutter-arms mounted on said shaft, of the extensible conveyer mounted concentrically around said shaft, one end being secured to the main frame, and the other to the cutter-arms, said conveyer comprising the slotted parts $r$, $r$, and the connecting-pieces, $z$, $z$, substantially as set forth.

6. In a tunneling-machine, the combination of the main frame, the engine, the power-shaft, the cutter-shaft arranged parallel thereto, two sets of gear connecting the power-shaft with the cutter-shaft, and a wheel sliding on said power-shaft and adapted to engage with either of said sets of gear, whereby one or both sets may be actuated to vary the speed and power of the cutters, substantially as set forth.

7. In a tunneling-machine, the combination of the cutters, the cutter-carrier, the main frame adapted to be advanced or withdrawn intermittingly, a positive lock for intermittingly fastening said frame stationarily to the tunnel-wall, a roller or equivalent adapted to rest against the tunnel-wall when the frame is in motion, and means connecting said lock with said roller, whereby said roller and said lock are pressed into engagement with the wall alternately, substantially as set forth.

8. In a tunneling-machine, the combination of the cutters, the cutter-carrier, the gearing for actuating said cutter-carrier, a main frame supporting said gearing and said cutter-carrier and adapted to be advanced intermittingly, a lock for positively securing said frame to the tunnel-wall when the frame is at rest, a roller adapted to rest against the tunnel-wall when the frame is in motion, and a lever connecting said roller and said lock whereby when the lock is withdrawn the roller is pressed into engagement with the wall, substantially as set forth.

9. In a tunneling-machine, the combination with the frame adapted to be moved forward intermittingly, the cutters, the gearing, and the supporting-wheels for the main frame, of a lever $f^2$ mounted on the frame, a roller $e^2$ mounted on one end of the lever, and a screw-pin $h^2$ situated above the other end of the lever, and engaging with the tunnel-walls when the frame is stationary, whereby the roller is brought to bear against the top wall of the tunnel when the pin is unscrewed, to guide the frame during its movements forward, substantially as set forth.

10. The combination with the frame, the engine, the gearing, the cutter-shaft, and the cutter-arm, of a conveyer mounted concentrically around said shaft, connected to the cutter-arm and to the frame, and having the arc-like plates $r$, one end of each plate having slots, and the other end having pins secured thereto, and passing through the slots of the next adjoining plate, substantially as set forth.

REGINALD STANLEY.

Witnesses:
ERNEST HARKER,
B. J. JARRETT.